United States Patent
Han

(10) Patent No.: US 12,316,975 B2
(45) Date of Patent: May 27, 2025

(54) AMBIENT LIGHT SENSING USING IMAGE SENSOR

(71) Applicant: SK hynix Inc., Icheon-si (KR)

(72) Inventor: Ji Hee Han, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 180 days.

(21) Appl. No.: 18/126,331

(22) Filed: Mar. 24, 2023

(65) Prior Publication Data

US 2024/0155245 A1 May 9, 2024

(30) Foreign Application Priority Data

Nov. 8, 2022 (KR) .................. 10-2022-0147645

(51) Int. Cl.
*H04N 23/71* (2023.01)
*G06T 7/11* (2017.01)
*H04N 23/72* (2023.01)

(52) U.S. Cl.
CPC ............ *H04N 23/71* (2023.01); *G06T 7/11* (2017.01); *H04N 23/72* (2023.01)

(58) Field of Classification Search
CPC ........ H04N 23/71; H04N 23/72; H04N 23/73; H04N 23/76; H04N 23/54; G06T 7/11
See application file for complete search history.

(56) References Cited

U.S. PATENT DOCUMENTS

| | | | |
|---|---|---|---|
| 10,650,504 B2 * | 5/2020 | Shin | H04N 23/72 |
| 2007/0182845 A1 | 8/2007 | Hunter | |
| 2009/0231364 A1 | 9/2009 | Tsai | |
| 2014/0055635 A1 | 2/2014 | Seo | |
| 2018/0091759 A1 * | 3/2018 | Shin | H04N 5/202 |
| 2019/0007593 A1 * | 1/2019 | Watanabe | H04N 23/71 |
| 2019/0075229 A1 * | 3/2019 | Kamiya | H04N 23/71 |
| 2021/0150251 A1 | 5/2021 | Chen et al. | |
| 2023/0360374 A1 | 11/2023 | Okuike | |

FOREIGN PATENT DOCUMENTS

| | | |
|---|---|---|
| KR | 100992367 B1 | 11/2010 |
| KR | 1020130066851 A | 6/2013 |
| KR | 101678691 B1 | 11/2016 |
| KR | 1020200089593 A | 7/2020 |

* cited by examiner

Primary Examiner — Gevell V Selby
(74) Attorney, Agent, or Firm — WILLIAM PARK & ASSOCIATES LTD.

(57) ABSTRACT

A device performs ambient light sensing using an image sensor. The device includes an image sensor and a receiver configured to receive image data from the image sensor. The device also includes a luminance calculator configured to calculate a code corresponding to the luminance value of the image data based on the image data. The device further includes an image sensor controller configured to change the setup condition of the image sensor in response to the code having a minimum value or a maximum value, among values capable of being assumed by the code. The device additionally includes a brightness measurer configured to output a brightness value in the vicinity of the image sensor, which is identified using the changed setup condition and the code.

17 Claims, 9 Drawing Sheets

AMBIENT LIGHT SENSING USING IMAGE SENSOR

CROSS-REFERENCE TO RELATED APPLICATION

The present application claims priority under 35 U.S.C. § 119(a) to Korean patent application number 10-2022-0147645, filed on Nov. 8, 2022, in the Korean Intellectual Property Office, the entire disclosure of which is incorporated herein by reference.

BACKGROUND

1. Technical Field

Various embodiments of the present disclosure relate to technology for measuring a brightness in the vicinity of an image sensor using the image sensor.

2. Related Art

Recently, various technologies for increasing battery life have been developed in the field of mobile devices. Particularly, because a Liquid Crystal Display (LCD) with backlighting are one of components consuming large amounts of power, a mobile device minimizes the driving times of the LCD and the backlight depending on the ambient brightness. Here, the mobile device identifies the brightness in the vicinity of the mobile device using an ambient light sensor (or an illuminance sensor).

SUMMARY

When the mobile device further includes a hardware component referred to as an ambient light sensor (or an illuminance sensor) for measuring the ambient brightness, a problem of mounting space and/or a problem of additional power consumption may be caused.

Various embodiments of the present disclosure are directed to an image processor. The image processor may include: a receiver configured to receive image data from an image sensor; a luminance calculator configured to calculate a code corresponding to the luminance value of the image data based on the image data; an image sensor controller configured to change the setup condition of the image sensor in response to the code having a minimum value or a maximum value, among values capable of being assumed by the code; and a brightness measurer configured to output a brightness value in the vicinity of the image sensor, which is identified using the changed setup condition and the code.

An embodiment of the present disclosure may provide for a device. The device may include an image sensor configured to acquire image data under the control of an image processor. The image processor may be configured to calculate a first code corresponding to the luminance value of first image data based on the first image data received from the image sensor, to change the setup condition of the image sensor in response to the first code having a minimum value or a maximum value, among values capable of being assumed by the first code, and to output a brightness value in the vicinity of the image sensor, which is identified using the changed setup condition and a second code corresponding to second image data captured through the image sensor depending on the changed setup condition.

An embodiment of the present disclosure may provide for a method of measuring a brightness. The method may include: calculating a first code corresponding to a luminance value of first image data based on the first image data captured through an image sensor; changing the setup condition of the image sensor in response to the first code having a minimum value or a maximum value, among values capable of being assumed by the first code; and identifying a brightness in a vicinity of the image sensor using the changed setup condition and a second code corresponding to second image data captured through the image sensor depending on the changed setup condition.

DETAILED DESCRIPTION

Specific structural or functional descriptions in the embodiments of the present disclosure introduced in this specification or application are only for description of the embodiments of the present disclosure. The descriptions should not be construed as being limited to the embodiments described in the specification or application.

Hereinafter, embodiments of the present disclosure are described with reference to the accompanying drawings to describe the present disclosure in detail so that those having ordinary knowledge in the technical field to which the present disclosure pertains can practice the present disclosure.

Figure 1:
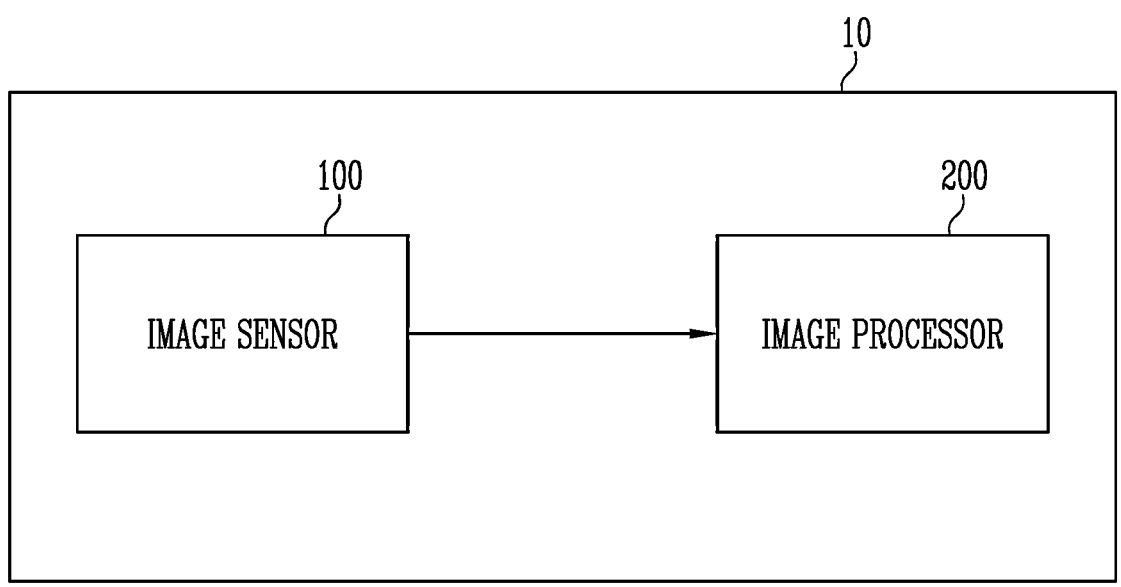
FIG. 1 is a diagram illustrating a device according to an embodiment of the present disclosure.

FIG. 1 is a diagram illustrating a device 10 according to an embodiment of the present disclosure.

Referring to FIG. 1, the device 10 may include an image sensor 100 and an image processor 200. For example, the device 10 may correspond to a digital camera, a mobile device, a smartphone, a tablet PC, a Personal Digital Assistant (PDA), an Enterprise Digital Assistant (EDA), a digital still camera, a digital video camera, a Portable Multimedia Player (PMP), a Mobile Internet Device (MID), a Personal Computer (PC), a wearable device, or a device including a multi-purpose camera. Alternatively, the device 10 of FIG. 1 may correspond to a component or module (e.g., a camera module) mounted in other electronic devices.

The image sensor 100 may be implemented as a charge-coupled device (CCD) image sensor or a complementary metal oxide semiconductor (CMOS) image sensor. The image sensor 100 may generate image data for light incident through a lens (not illustrated). For example, the image sensor 100 may convert light information of a subject, which is incident through a lens, into an electrical signal and provide the electrical signal to the image processor 200. The lens may include at least one lens forming an optical system.

The image sensor 100 may include a plurality of pixels. The image sensor 100 may generate image data corresponding to a captured scene through the plurality of pixels. The image data may include a plurality of pixel values DPXs. Each of the plurality of pixel values DPXs may be a digital pixel value. The image sensor 100 may transmit the generated image data to the image processor 200. That is, the image sensor 100 may provide the image data, including the plurality of pixel values DPXs acquired through the plurality of pixels, to the image processor 200.

The image processor 200 may perform image processing on the image data received from the image sensor 100. For example, the image processor 200 may perform at least one of interpolation, Electronic Image Stabilization (EIS), tonal correction (hue correction), image quality correction, and size adjustment on the image data. The image processor 200 according to the present disclosure may identify the brightness in the vicinity of the device 10 based on the image data. The image processor 200 may be referred to as an image processing device.

Referring to FIG. 1, the image processor 200 may be implemented as a chip independent from the image sensor 100. In this case, the chip of the image sensor 100 and the chip of the image processor 200 may be implemented as a single package, e.g., a multi-chip package. However, without limitation thereto, the image processor 200 may be included in the image sensor 100 as a part thereof to be implemented as a single chip according to another embodiment of the present disclosure.

Figure 2A:
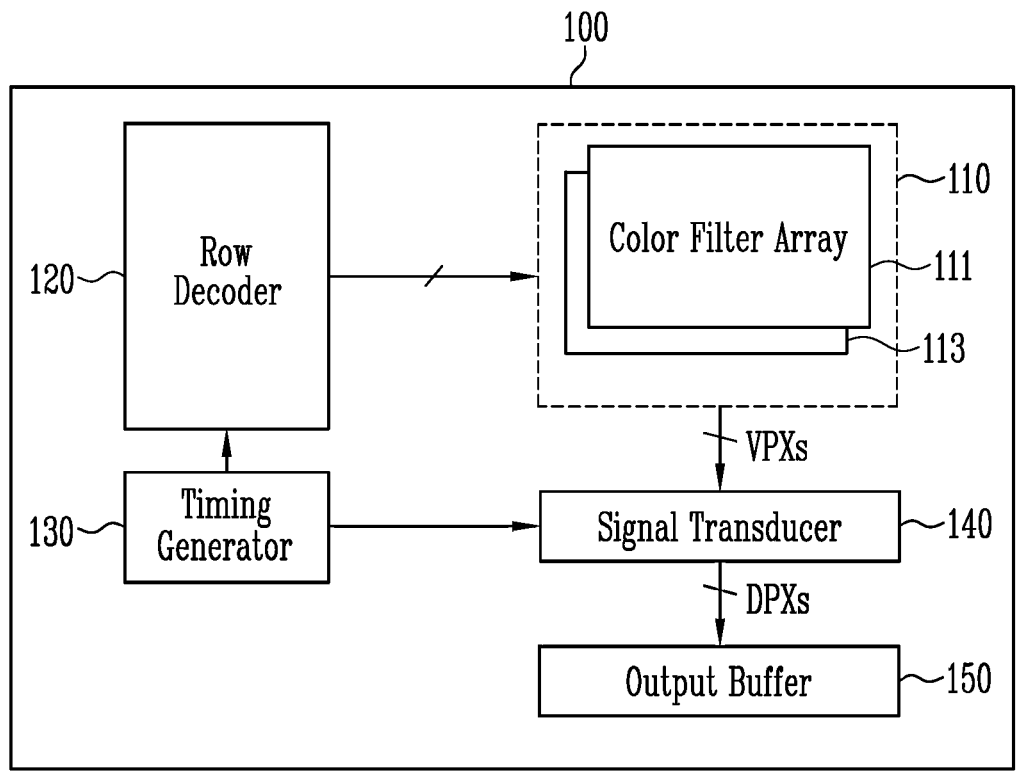
FIG. 2A is a diagram illustrating an embodiment of the image sensor 100.

FIG. 2A is a diagram illustrating an embodiment of the image sensor 100.

Referring to FIG. 2A, the image sensor 100 may include a pixel array 110, a row decoder 120, a timing generator 130, and a signal transducer 140. Also, the image sensor 100 may further include an output buffer 150.

The pixel array 110 may include a plurality of pixels arranged in a row direction and a column direction. The respective pixels may generate pixel signals VPXs corresponding to the intensity of light incident thereto. The image sensor 100 may read out a plurality of pixel signals VPXs for each row of the pixel array 110. Each of the plurality of pixel signals VPXs may be an analog pixel signal.

The pixel array 110 may include a color filter array 111. Each of the plurality of pixels may output a pixel signal corresponding to incident light that passes through the corresponding color filter array 111.

The color filter array 111 may include color filters configured to transmit only a specific wavelength (e.g., red, green, or blue) of light incident to each pixel. Because of the color filter array 111, the pixel signal of each pixel may represent a value corresponding to the intensity of light having a specific wavelength.

The pixel array 110 may include a photoelectric conversion layer 113 including a plurality of photoelectric conversion elements formed under the color filter array 111. Each of the plurality of pixels may generate a photocharge corresponding to the incident light through the photoelectric conversion layer 113. The plurality of pixels may accumulate the generated photocharges and generate pixel signals VPXs corresponding to the accumulated photocharges.

The photoelectric conversion layer 113 may include photoelectric conversion elements corresponding to the respective pixels. For example, the photoelectric conversion element may be at least one of a photo diode, a photo transistor, a photogate, and a pinned photo diode. The plurality of pixels may generate photocharges corresponding to light incident to the respective pixels through the photoelectric conversion layer 113 and acquire electrical signals corresponding to the photocharges through at least one transistor.

The row decoder 120 may select one of a plurality of rows in which a plurality of pixels are arranged in the pixel array 110 in response to an address and control signals output from the timing generator 130. The image sensor 100 may read out pixels included in a specific row, among the plurality of pixels included in the pixel array 110, under the control of the row decoder 120.

The signal transducer 140 may convert analog pixel signals VPXs into digital pixel values DPXs. The signal transducer 140 may perform correlated double sampling (CDS) on each of the plurality of pixel signals VPXs output from the pixel array 110 in response to the control signals output from the timing generator 130 and output the plurality of pixel values DPXs acquired through analog-to-digital conversion of the respective signals on which CDS is performed.

The signal transducer 140 may include a correlated double sampling (CDS) block and an analog-to-digital converter (ADC) block. The CDS block may sequentially sample and hold a set comprising a reference signal and an image signal provided from a column line included in the pixel array 110. Here, the reference signal may correspond to a pixel signal that is read out after a pixel included in the pixel array 110 is reset, and the image signal may correspond to a pixel signal that is read out after the pixel is exposed. The CDS block may acquire a signal having reduced readout noise using the difference between the level of the reference signal corresponding to each of the columns and the level of the image signal corresponding thereto. The ADC block converts the analog signal (e.g., a pixel signal VPXs) for each column, which is output from the CDS block, into a digital signal, thereby outputting the digital signal (e.g., a pixel value DPXs). To this end, the ADC block may include a comparator and a counter corresponding to each column.

The output buffer 150 may be implemented as a plurality of buffers configured to store the digital signals output from the signal transducer 140. Specifically, the output buffer 150 may latch and output the pixel values of each column provided from the signal transducer 140. The output buffer 150 may temporarily store pixel values output from the signal transducer 140 and sequentially output the pixel values under the control of the timing generator 130. The sequentially output pixel values may be understood as being included in image data. According to an embodiment of the present disclosure, the output buffer 150 may be omitted.

Figure 2B:
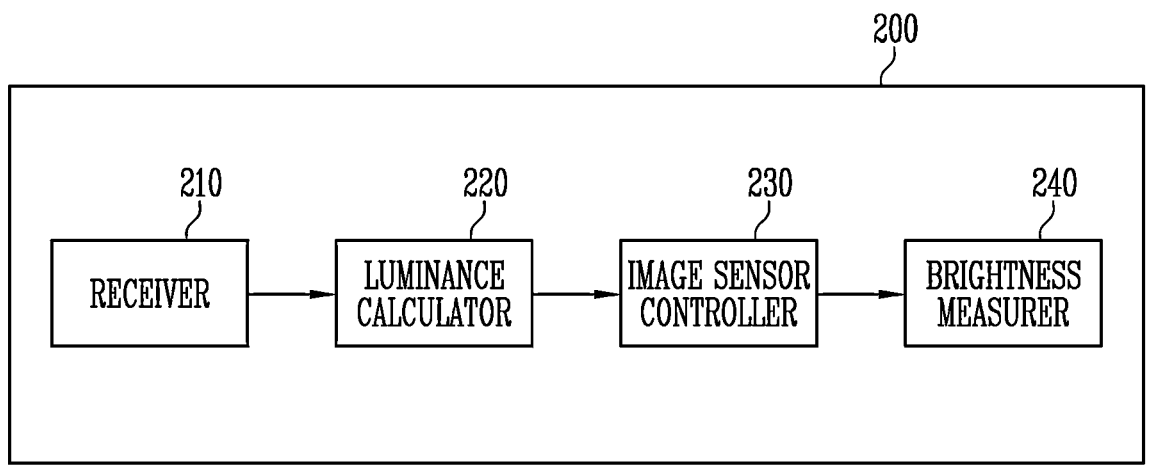
FIG. 2B is a diagram illustrating an embodiment of the image processor 200.

FIG. 2B is a diagram illustrating an embodiment of the image processor 200.

Referring to FIG. 2B, the image processor 200 may include a receiver 210, a luminance calculator 220, an image sensor controller 230, and a brightness measurer 240. In some embodiments, the receiver 210, the luminance calculator 220, the image sensor controller 230, and the brightness measurer 240 may be electronic circuits.

The receiver 210 may receive image data from the image sensor 100. For example, the image processor 200 may receive image data that is captured and output by the image sensor 100. The image data received by the receiver 210 will be described later with reference to FIG. 5.

The luminance calculator 220 may calculate a code corresponding to the luminance value of image data based on the image data. For example, the luminance calculator 220 may calculate a representative luminance value of the image data. A specific method in which the luminance calculator 220 calculates a code based on image data will be described later with reference to FIGS. 6 to 8.

The image sensor controller 230 may change the setup condition of the image sensor 100 in response to the code having a minimum value or a maximum value, among values capable of being represented through the code. The setup condition of the image sensor 100 may include at least one of the analog gain of the image sensor 100 and the exposure time of the image sensor 100. For example, the image sensor controller 230 may change the setup condition of the image sensor 100 by selecting any one of a designated number of setup condition candidates having preset values. The case of controlling the setup condition of the image sensor 100 and the method of controlling the same will be described later with reference to FIG. 10.

The brightness measurer 240 may identify a brightness in the vicinity of the image sensor 100 (or a brightness in the vicinity of the device 10) using the setup condition of the image sensor 100 and the code. The brightness measurer 240 may output the identified brightness value. For example, the brightness measurer 240 may provide the brightness value to a processor (e.g., an Application Processor (AP)).

Figure 3:
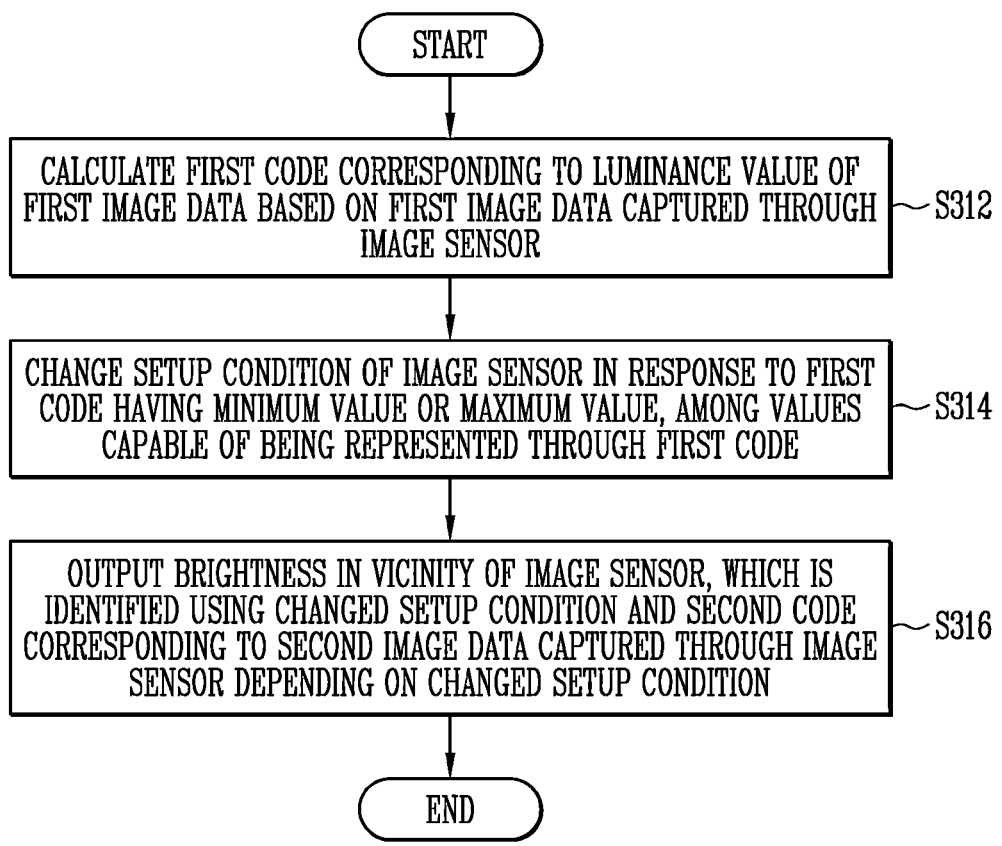
FIG. 3 is a flowchart illustrating a method for measuring a brightness in the vicinity of a device according to an embodiment of the present disclosure.

FIG. 3 is a flowchart illustrating a method for measuring a brightness in the vicinity of a device according to an embodiment of the present disclosure. The operations explained in FIG. 3 may be understood as being performed by the device 10 of FIG. 1 or the image processor 200 of FIG. 2B.

At S312, the image processor 200 (e.g., the luminance calculator 220) may calculate a first code corresponding to the luminance value of first image data captured through the image sensor 100. For example, the image processor 200 (e.g., the luminance calculator 220) may segment the first image data into two or more regions and calculate the first code based on the respective luminance values of the two or more regions. A specific method for calculating the first code based on the first image data will be described later with reference to FIGS. 6 to 8.

At S314, the image processor 200 (e.g., the image sensor controller 230) may change the setup condition of the image sensor 100 in response to the first code having a minimum value or a maximum value, among values capable of being represented through the first code. For example, the image processor 200 (e.g., the image sensor controller 230) may determine whether a designated event occurs based on the first code, and may change the setup condition of the image sensor 100 in response to occurrence of the designated event. The designated event may be an event in which the first code has the minimum value or the maximum value, among values capable of being represented through the first code. For example, when the first code has 8 bits, the value capable of being represented through the first code may range from 0 to 255. Accordingly, the minimum value may be 0, and the maximum value may be 255. The designated event will be described later with reference to FIG. 9 and FIG. 10.

The image processor 200 (e.g., the image sensor controller 230) may maintain the setup condition of the image sensor 100 when the designated event does not occur, but may change the setup condition of the image sensor 100 when the designated event occurs. The setup condition of the image sensor 100 may include at least one of the analog gain of the image sensor 100 and the exposure time of the image sensor 100. Control of the setup condition of the image sensor 100 will be described later with reference to FIG. 9 and FIG. 10.

At S316, the image processor 200 (e.g., the brightness measurer 240) may output the brightness in the vicinity of the image sensor 100 (or the brightness in the vicinity of the device 10), which is identified using the changed setup condition and a second code corresponding to second image data that is captured through the image sensor 100 depending on the changed setup condition. A specific method for identifying the ambient brightness using the changed setup condition and the second code will be described later with reference to FIG. 9.

In an embodiment, the device 10 may further include a display and a processor configured to control the display. The processor may receive a brightness value, corresponding to the brightness in the vicinity of the device 10, from the image processor 200, and may control the display using the brightness value. For example, when the brightness in the vicinity of the device 10 is less than a threshold value (e.g., when it is dark), the processor may reduce the brightness of the display or deactivate the display. In another example, when the brightness in the vicinity of the device 10 is equal to or greater than the threshold value (e.g., when it is bright), the processor may activate the display or increase the brightness of the display. In addition, the device 10 may variously use the brightness value.

Figure 4:
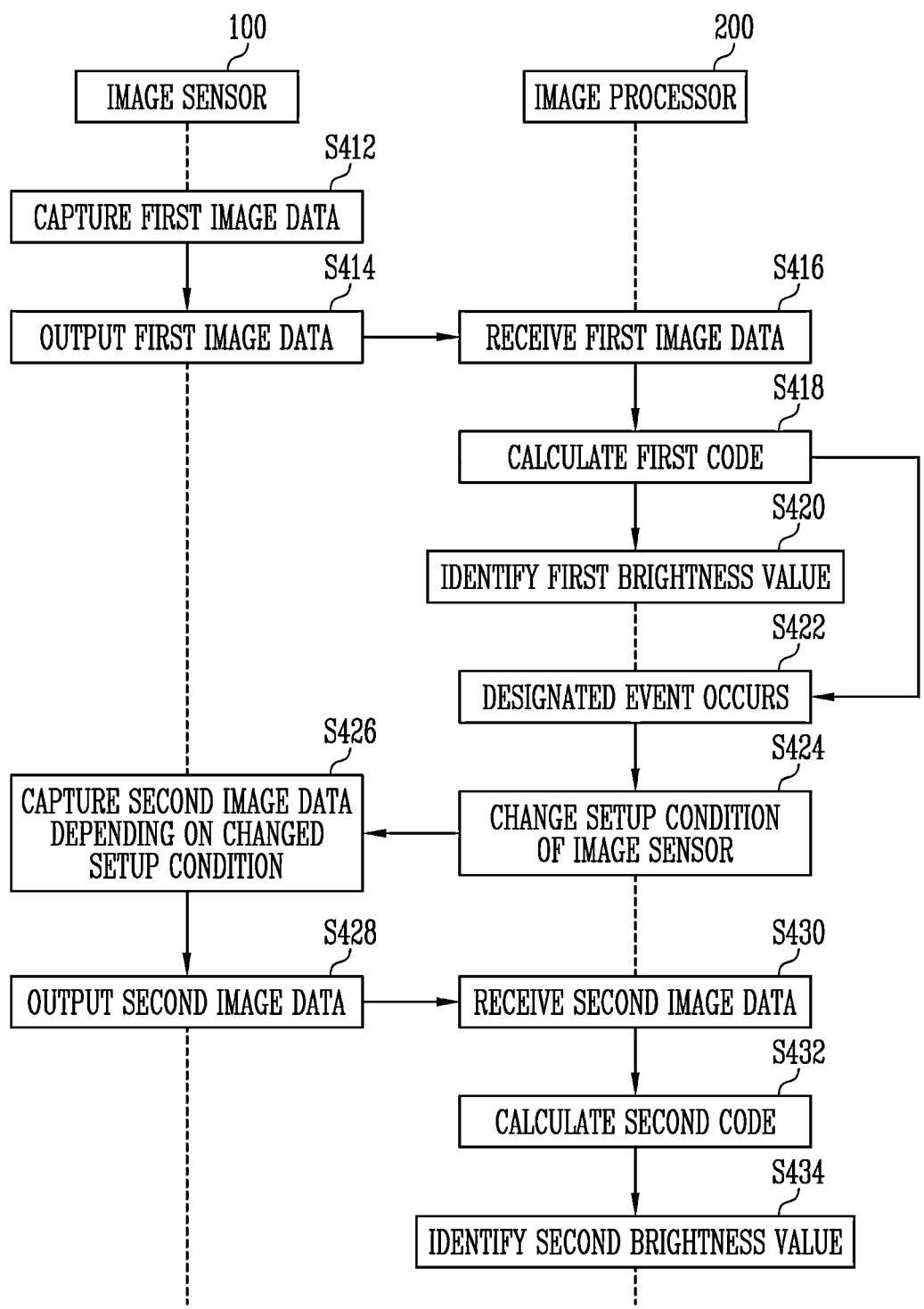
FIG. 4 is a flowchart illustrating in more detail a method for measuring a brightness in the vicinity of a device according to an embodiment of the present disclosure.

FIG. 4 is a flowchart illustrating in more detail a method for measuring a brightness in the vicinity of a device according to an embodiment of the present disclosure. The operations described in FIG. 4 may be understood as being performed by the image sensor 100 illustrated in FIG. 1 and FIG. 2A and the image processor 200 illustrated in FIG. 1 and FIG. 2B.

At S412, the image sensor 100 may capture first image data. At S414, the image sensor 100 may output the first image data. The first image data provided to the image processor 200 by the image sensor 100 at S414 will be described later with reference to FIG. 5.

At S416, the image processor 200 (e.g., the receiver 210) may receive the first image data from the image sensor 100. At S418, the image processor 200 (e.g., the luminance calculator 220) may calculate a first code based on the first image data. The method in which the image processor 200 calculates the first code based on the first image data at S418 will be described later with reference to FIGS. 6 to 8.

At S420, the image processor 200 (e.g., the brightness measurer 240) may identify a first brightness value, corresponding to the brightness in the vicinity of the image sensor 100 (or the brightness in the vicinity of the device 10) at the time at which the first image data was captured, based on the first code. The image processor 200 (e.g., the brightness measurer 240) may measure the first brightness value using a previously stored lookup table. Identifying the first brightness value will be described later with reference to FIG. 9.

At S422, the image processor 200 (e.g., the image sensor controller 230) may determine whether a designated event occurs based on the first code calculated at S418. For example, the image processor 200 (e.g., the image sensor controller 230) may determine that the designated event occurs when the value of the first code is a minimum value or a maximum value, among values capable of being represented through the first code.

At S424, the image processor 200 (e.g., the image sensor controller 230) may change the setup condition of the image sensor 100 in response to the occurrence of the designated event with regard to the first code. For example, the setup condition of the image sensor 100 may include at least one of the analog gain of the image sensor 100 and the exposure time of the image sensor 100.

The image processor 200 (e.g., the image sensor controller 230) may increase the analog gain and exposure time of the image sensor 100 in response to the first code having the minimum value. Also, the image processor 200 (e.g., the image sensor controller 230) may decrease the analog gain and exposure time of the image sensor 100 in response to the first code having the maximum value. The change of the setup condition of the image sensor 100 will be described later with reference to FIG. 10.

At S426, the image sensor 100 may capture second image data depending on the setup condition changed by the control of the image processor 200. At S428, the image sensor 100 may output the second image data.

At S430, the image processor 200 (e.g., the receiver 210) may receive the second image data from the image sensor 100. At S432, the image processor 200 (e.g., the luminance calculator 220) may calculate a second code based on the second image data. The method in which the image processor 200 calculates the second code based on the second image data at S432 will be described later with reference to FIGS. 6 to 8.

At S434, the image processor 200 (e.g., the brightness measurer 240) may identify a second brightness value, corresponding to the brightness in the vicinity of the image sensor 100 (or the brightness in the vicinity of the device 10) at the time at which the second image data was captured, based on the second code. The image processor 200 (e.g., the brightness measurer 240) may measure the second brightness value using a previously stored lookup table. Identifying the second brightness value will be described later with reference to FIG. 9.

Figure 5:
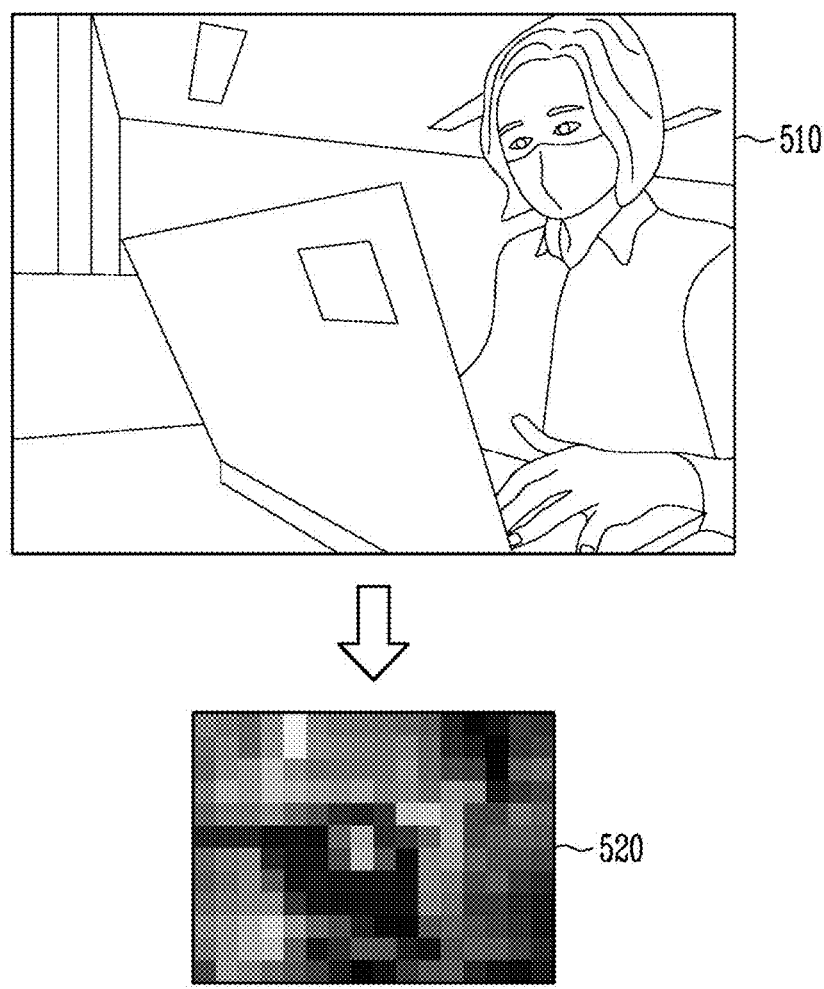
FIG. 5 is a diagram illustrating an example of image data provided to an image processor by an image sensor according to an embodiment of the present disclosure.

FIG. 5 is a diagram illustrating an example of image data provided to an image processor by an image sensor according to an embodiment of the present disclosure.

Referring to FIG. 5, the image sensor 100 may convert the original image 510 captured through the pixel array 110 into luminance data 520 and output the luminance data 520. The original image 510 may have a number of pixels corresponding to the number of pixels included in the pixel array 110. The luminance data 520 may have a smaller number of pixels than the original image 510. For example, the luminance data 520 may include 16×12 pixels.

The luminance data 520 may include a designated number (e.g., 16×12) of luminance values. Also, each of the luminance values included in the luminance data 520 may have a fixed number (e.g., 8) of bits. For example, the image sensor 100 may output luminance data 520 including 16×12 8-bit luminance values.

With regard to ambient light sensing performed by the image processor 200, the image sensor 100 may output the luminance data 520 acquired by converting the original image 510 (e.g., converting the same into luminance values and/or decreasing the number of pixels thereof). The image processor 200 (e.g., the receiver 210) may receive the luminance data 520 from the image sensor 100. The image processor 200 may calculate the representative luminance value (representative Y value) of the luminance data 520 based on the luminance data 520 received from the image sensor 100. The representative Y value may be a code having a designated number (e.g., 8) of bits.

In the present disclosure, the luminance data 520 may be referred to as image data (e.g., first image data or second image data), and the representative Y value may be referred to as a code (e.g., a first code or a second code). Each of the first image data and the second image data at S312 and S316 of FIG. 3 may be in the form of luminance data 520 of FIG. 5, and each of the first image data and the second image data at S412, S414, S416, S426, S428, and S430 of FIG. 4 may also be in the form of luminance data 520.

Figure 6:
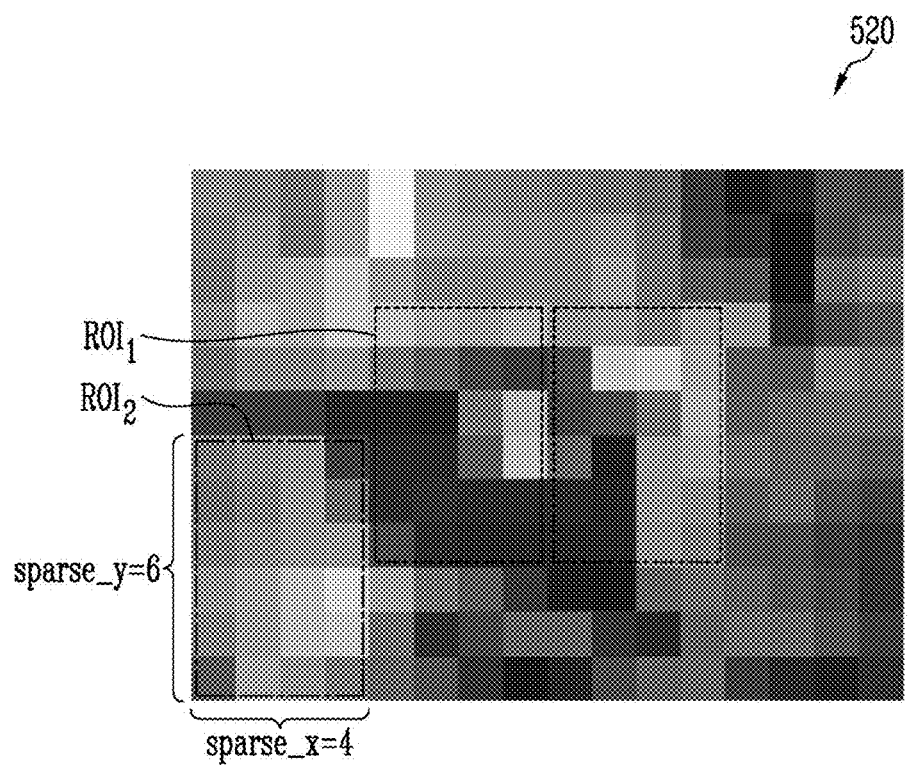
FIG. 6 is a diagram illustrating a method in which an image processor calculates a code based on image data according to an embodiment of the present disclosure.
Figure 7:
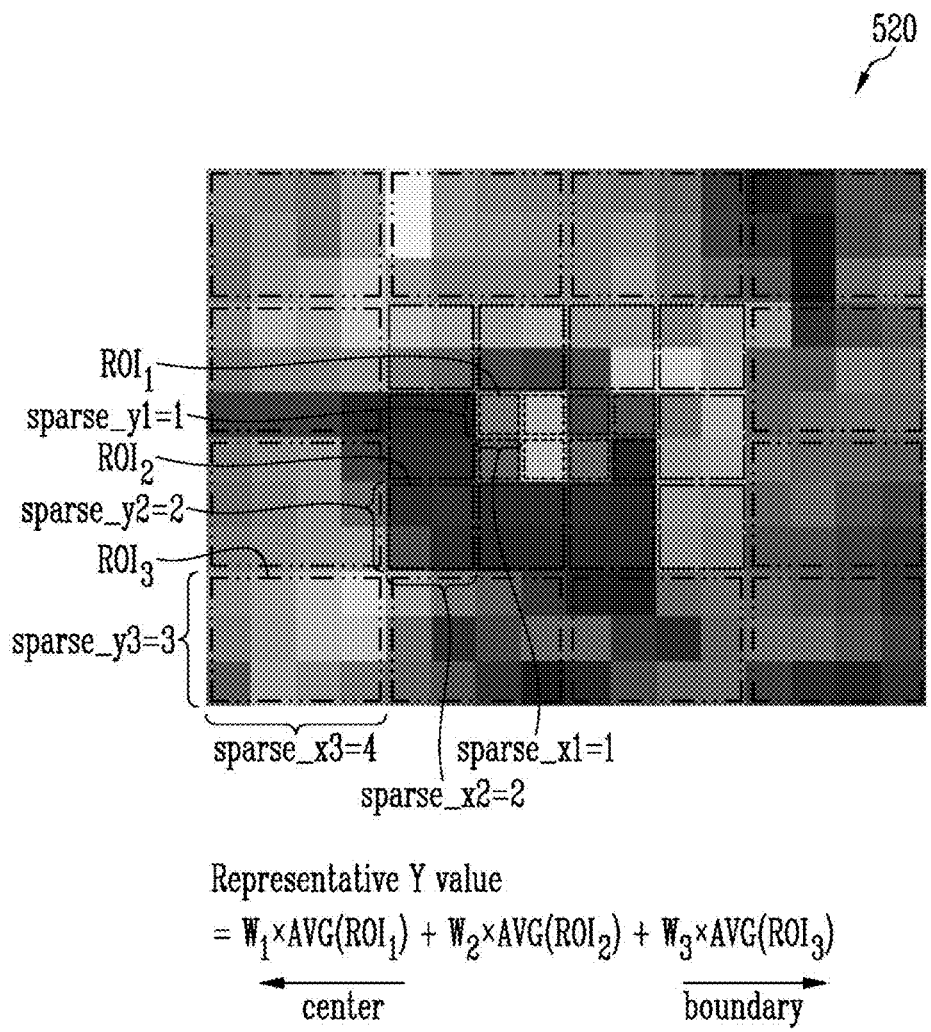
FIG. 7 is a diagram illustrating another method in which an image processor calculates a code based on image data according to an embodiment of the present disclosure.

FIG. 6 is a diagram illustrating a method in which an image processor calculates a code based on image data according to an embodiment of the present disclosure. FIG. 7 is a diagram illustrating another method in which the image processor calculates a code based on image data according to an embodiment of the present disclosure.

Referring to FIG. 6 and FIG. 7, two examples of the method for calculating a first code (or a second code) corresponding to the luminance value of first image data (or second image data) based on the first image data (or the second image data), among the operations in FIG. 3 and FIG. 4, are described. The luminance data 520 of FIG. 6 and FIG. 7 may correspond to image data (e.g., first image data or second image data), and the representative Y value of FIG. 6 and FIG. 7 may correspond to a code (e.g., a first code or a second code).

The image processor 200 (e.g., the luminance calculator 220) may segment the luminance data 520 into two or more regions and calculate a representative Y value based on the respective luminance values of the two or more regions. For example, the image processor 200 segments the luminance data 520 into a plurality of regions of interest (ROI), calculates the luminance value of each ROI using at least one luminance value included in the ROI, and adds the respective luminance values of the Regions of Interest multiplied by weights applied thereto, thereby calculating the representative Y value of the luminance data 520. That is, the image processor 200 may segment the luminance data 520 into a plurality of regions and calculate the representative Y value through the weighted sum.

Here, as the method in which the image processor 200 segments the luminance data 520 into two or more regions (e.g., regions of interest (ROI)), there are a method of segmenting the luminance data into identical sizes, which is described in FIG. 6, and a method of segmenting the luminance data into adaptive sizes, which is described in FIG. 7.

Referring to FIG. 6, the image processor 200 may segment the luminance data 520 received from the image sensor 100 into regions $ROI_1$ and $ROI_2$ having the same size. For example, when the luminance data 520 has a size of 16×12, the image processor 200 may segment the luminance data 520 into regions $ROI_1$ and $ROI_2$, each having a size of 4×6. The number of horizontal pixels (sparse_x) of each of the regions $ROI_1$ and $ROI_2$ may be 4, and the number of vertical pixels (sparse_y) thereof may be 6. When the size of each region $ROI_1$ or $ROI_2$ is 4×6, a grid number may be 8 (grid number=(width/sparse_x)×(height/sparse_y)=(16/4)×(12/6)=4×2=8).

For example, the image processor 200 may segment the luminance data 520 into two central regions $ROI_1$ and six boundary regions $ROI_2$. For example, the image processor 200 may segment the luminance data 520 into two boundary regions ROI$_2$ on the left side of the central regions ROI$_1$, two boundary regions ROI$_2$ on the right side of the central regions ROI$_1$, and two boundary regions in which luminance values located on the upper and lower sides of the central regions ROI$_1$ are reconfigured. Each of the two boundary regions in which the luminance values located on the upper and lower sides of the central regions ROI$_1$ are reconfigured may be a region having a size of 4×6, including a region having a size of 4×3 and located on the upper side of any one central region ROI$_1$ and a region having a size of 4×3 and located on the lower side thereof. Alternatively, each of the two boundary regions in which the luminance values located on the upper and lower sides of the central regions ROI$_1$ are reconfigured may be a region having a size of 8×3 and located on the upper side of the central regions ROI$_1$ or a region having a size of 8×3 and located on the lower side thereof. In addition, the image processor 200 may segment the luminance data 520 in any of various manners. For example, the image processor 200 may alternatively segment the luminance data 520 into regions, each having a size of 4×3.

Referring to FIG. 6, the image processor 200 may apply different weights W$_1$ and W$_2$ to the central regions ROI$_1$, corresponding to the center of the luminance data 520, and the boundary regions ROI$_2$, corresponding to the boundary of the luminance data 520. The image processor 200 may calculate the representative Y value of the luminance data 520 through Equation (1):

Representative $Y$ value=$W_1$AVG(ROI$_1$)+$W_2$×AVG (ROI$_2$)       (1)

Referring to Equation (1), the image processor 200 multiplies the average value of the respective luminance values of the central regions ROI$_1$ (AVG(ROI$_1$)) by the weight W$_1$, multiplies the average value of the respective luminance values of the boundary regions ROI$_2$ (AVG(ROI$_2$)) by the weight W$_2$, and adds the two multiplication results, thereby calculating the representative Y value.

Referring to FIG. 7, the image processor 200 may alternatively segment the luminance data 520 received from the image sensor 100 into regions ROI$_1$, ROI$_2$, and ROI$_3$ having adaptive sizes. The image processor 200 may segment the luminance data 520 into regions ROI$_1$, ROI$_2$, and ROI$_3$ having different sizes from the center thereof to the boundaries thereof. For example, when the luminance data 520 has a size of 16×12, the image processor 200 may segment the luminance data 520 into regions ROI$_1$ each having a size of 1×1, regions ROI$_2$ each having a size of 2×2, and regions ROI$_3$ each having a size of 4×3 in the direction from the center of the luminance data 520 to the boundaries thereof.

In the case of the regions ROI$_1$ corresponding to the center of the luminance data 520, the number of horizontal pixels (sparse_x1) may be 1 and the number of vertical pixels (sparse_y1) may be 1. In the case of the regions ROI$_2$ that are located outwards relative to the region ROI$_1$ corresponding to the center of the luminance data 520, the number of horizontal pixels (sparse_x2) may be 2 and the number of vertical pixels (sparse_y2) may be 2. In the case of the regions ROI$_3$ corresponding to the boundary of the luminance data 520, the number of horizontal pixels (sparse_x3) may be 4 and the number of vertical pixels (sparse_y3) may be 3. When the luminance data 520 is segmented as illustrated in FIG. 7, the grid number may be 30, which is the sum of 8, 10, and 12, which are the number of regions ROI$_1$, the number of regions ROI$_2$, and the number of regions ROI$_3$, respectively.

Referring to FIG. 7, the image processor 200 may apply different weights W$_1$, W$_2$, and W$_3$ to the respective regions ROI$_1$, ROI$_2$, and ROI$_3$, which are acquired by segmenting the luminance data 520. The image processor 200 may calculate the representative Y value of the luminance data 520 through Equation (2):

Representative $Y$ value=$W_1$×AVG(ROI$_1$)+$W_2$×AVG (ROI$_2$)+$W_3$×AVG(ROI$_3$)       (2)

Referring to Equation (1) of FIG. 6 and Equation (2) of FIG. 7, the image processor 200 may acquire the representative Y value through the weighted sum, which multiplies different weights depending on the location (e.g., the center or the boundary) in the luminance data 520. For example, the image processor 200 may calculate the representative Y value using different methods depending on the difference between the luminance value of the central region (e.g., ROI$_1$ of FIG. 6) and the luminance value of the boundary region (e.g., ROI$_2$ of FIG. 6). When the difference between the luminance value of the central region and the luminance value of the boundary region is equal to or greater than a threshold value, the image processor 200 may determine that a subject, such as an object or a human, is included in the scene captured through the image sensor 100, and may calculate the representative Y value using the luminance value of the boundary region, excluding the central region. Also, when the difference between the luminance value of the central region and the luminance value of the boundary region is less than the threshold value, the image processor 200 may calculate the representative Y value using both the central region and the boundary region.

Describing in more detail the case in which the difference between the luminance value of the central region and the luminance value of the boundary region is equal to or greater than the threshold value, the image processor 200 may calculate the standard deviation of the luminance values in the entire boundary region, and may calculate the representative Y value using all of the luminance values included in the boundary region when the standard deviation is lower than a certain level. When the standard deviation is equal to or higher than the certain level, the image processor 200 may calculate the representative Y value using remaining luminance values, excluding the top/bottom N % of the luminance values included in the boundary region. The image processor 200 filters out the top/bottom N % of the luminance values, thereby minimizing the effect of outliers that can be included in the luminance data 520.

Similarly, describing in more detail the case in which the difference between the luminance value of the central region and the luminance value of the boundary region is less than the threshold value, the image processor 200 may calculate the representative Y value using remaining luminance values, excluding the top/bottom N % of all the luminance values of both the central region and boundary region.

Figure 8:
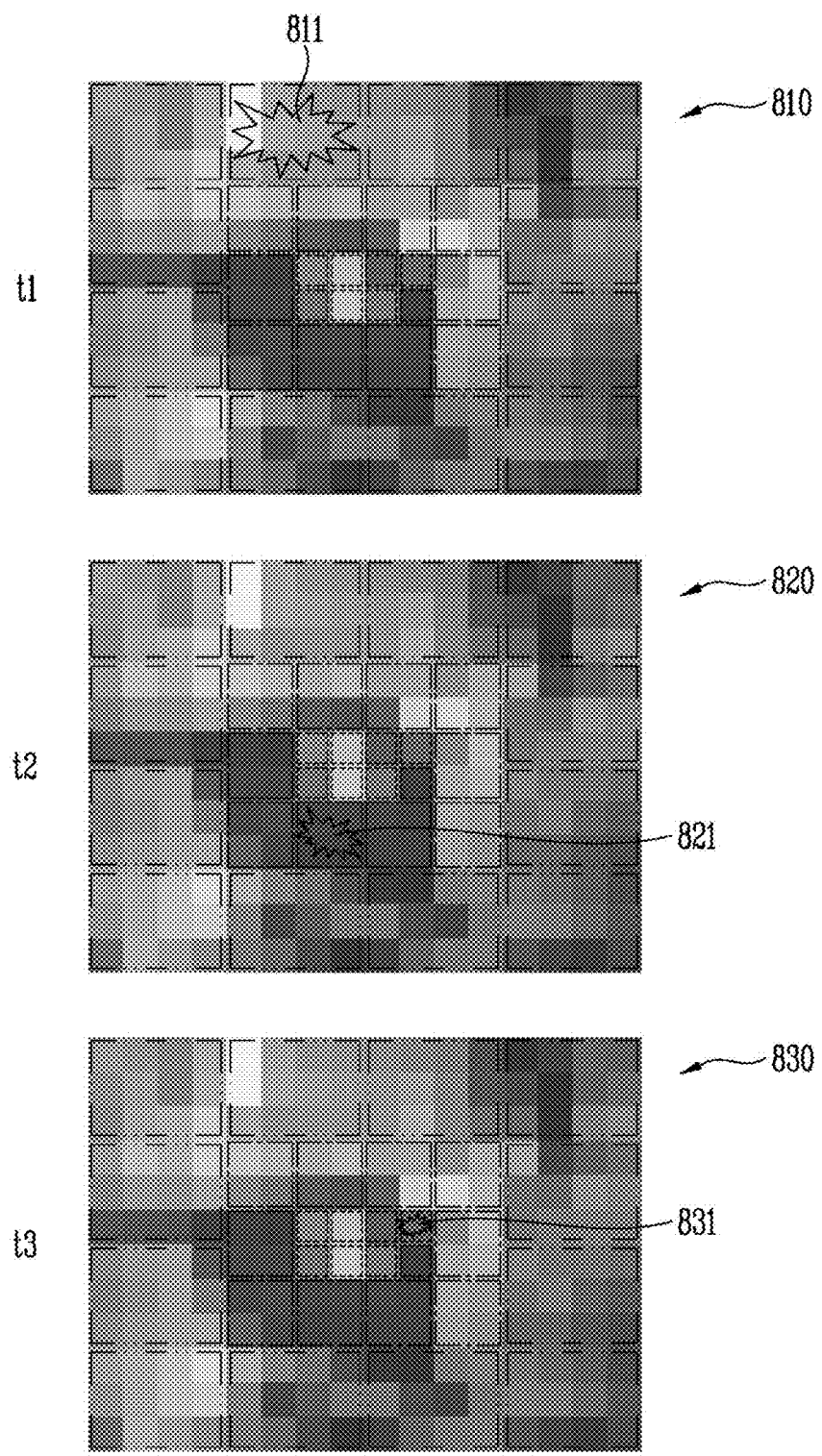
FIG. 8 is a diagram illustrating an example of calculating a code based on at least part of image data according to an embodiment of the present disclosure.

FIG. 8 is a diagram illustrating an example of calculating a code based on at least part of image data according to an embodiment of the present disclosure. Each of the pieces of luminance data 810, 820, and 830 illustrated in FIG. 8 may correspond to the luminance data 520 illustrated in FIG. 5.

Referring to FIG. 8, some regions of the luminance data 520 may include outliers. The outlier may indicate that the luminance value of a specific region of the luminance data 520 has a very large value or a very small value compared to other regions of the luminance data 520. For example, when only some regions of the luminance data 520 have a very large luminance value due to pixel saturation or the like, it may be understood that the corresponding regions include outliers.

The outlier may include spatial variation and temporal variation.

Referring to FIG. 8, a region of the luminance data 810 that is captured at time t1 may include an outlier 811. When the luminance value of the region corresponding to the outlier 811, among all the regions of the luminance data 810, falls out of a certain range, the outlier 811 may correspond to spatial variation. The outlier corresponding to spatial variation may occur when local light (e.g., a point source of light) is included in the captured scene.

Also, comparing the luminance data 810 captured at time t1, the luminance data 820 captured at time t2, and the luminance data 830 captured at time t3, the locations of the outliers 811, 821, and 831 may be different. When the pieces of luminance data 810, 820, and 830 that are captured at different times include the outliers 811, 821, and 831 at different locations, the outliers 811, 821, and 831 may be outliers corresponding to temporal variation. The outliers corresponding to temporal variation may occur when the capture device 10 (or the image sensor 100) is moved or shaken.

The image processor 200 may calculate the representative Y value using remaining regions, excluding the outliers 811, 821, and 831, to improve the accuracy of the representative Y value calculated based on the pieces of luminance data 810, 820 and 830. For example, the image processor 200 may calculate the representative Y value based on at least part of the pieces of luminance data 810, 820 and 830 to improve the accuracy of the representative Y value. The image processor 200 calculates the representative Y value after excluding the outliers 811, 821, and 831, thereby preventing the outliers 811, 821, and 831 from causing the representative Y value excessively higher or lower than the brightness of the actual scene to be calculated.

For example, the image processor 200 may exclude the outliers corresponding to spatial variation and/or the outliers corresponding to temporal variation by calculating the representative Y value using the remaining luminance values from which the top/bottom N % of the luminance values included in the pieces of luminance data 810, 820 and 830 are removed. However, this is an example, and the representative Y value may be calculated through any of various other methods.

Figure 9:
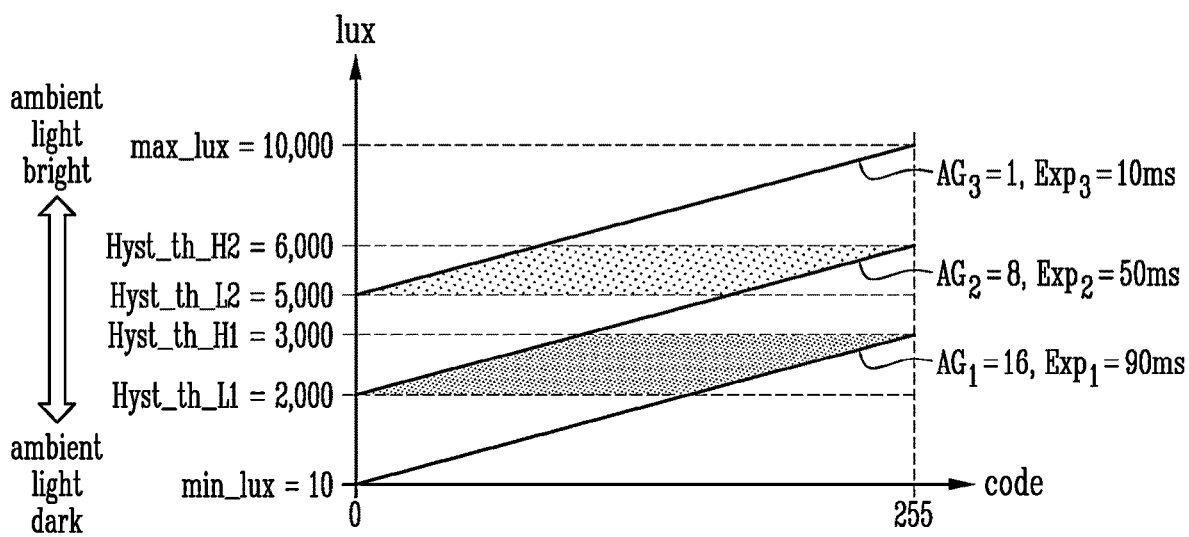
FIG. 9 is a diagram illustrating a method for identifying an ambient brightness based on a setup condition and a code according to an embodiment of the present disclosure.
Figure 10:
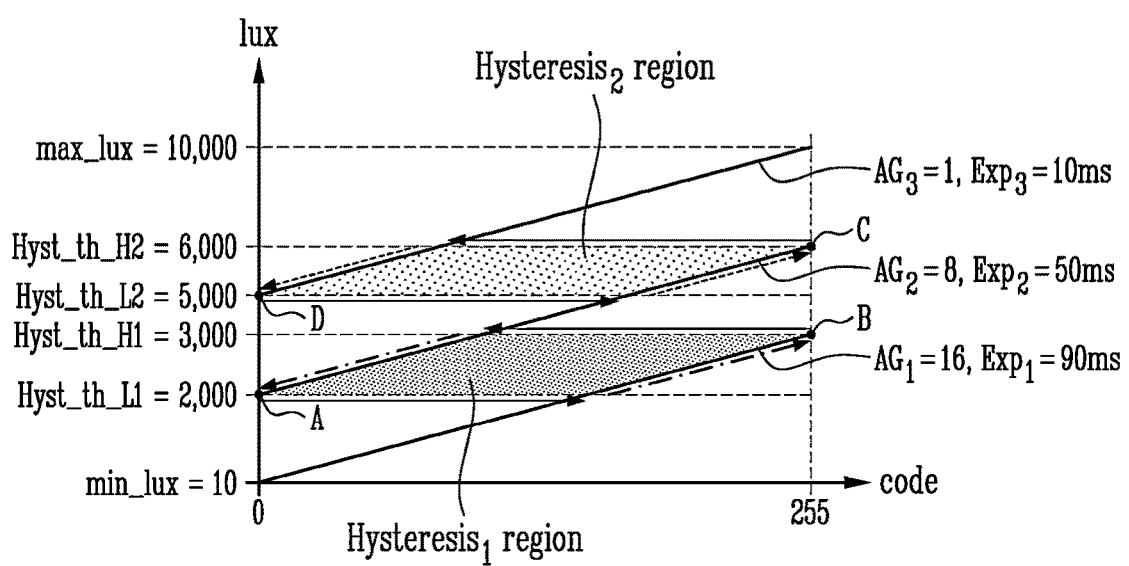
FIG. 10 is a diagram illustrating a method for changing a setup condition of an image sensor when a designated event occurs according to an embodiment of the present disclosure.

Referring to FIGS. 6 to 8, the image processor 200 (e.g., the luminance calculator 220) may calculate the representative Y value using the luminance data 520 acquired from the image sensor 100. Here, the representative Y value is a code having a designated number of bits (e.g., 8 bits), and may have, for example, a value ranging from 0 to 255. In FIG. 9 and FIG. 10, the method in which the brightness measurer 240 identifies the brightness in the vicinity of the device 10 (or the brightness in the vicinity of the image sensor 100) using the calculated representative Y value, that is, the code, and the method in which the image sensor controller 230 changes the setup condition of the image sensor 100 depending on the value of the code are described.

FIG. 9 is a diagram illustrating a method for identifying an ambient brightness based on a setup condition and a code according to an embodiment of the present disclosure.

According to S420 and S434 of FIG. 4, the image processor 200 (e.g., the brightness measurer 240) may identify the brightness in the vicinity of the image sensor 100 (or the brightness in the vicinity of the device 10) (e.g., a first brightness value or a second brightness value) based on the representative Y value (e.g., the first code or the second code). In FIG. 9, an example of a specific method in which the image processor 200 (e.g., the brightness measurer 240) identifies the ambient brightness based on the representative Y value (or the code) is described.

In the present disclosure, the setup condition of the image sensor 100 may be any one setup condition selected from among a designated number of setup condition candidates having preset values. For example, the device 10 may set and store a designated number (e.g., 3) of setup condition candidates in advance. Referring to FIG. 9, the setup condition candidates, which are previously set by the device 10, may comprise three candidates. Here, the first setup condition candidate may comprise the analog gain ($AG_1$) of 16 and the exposure time ($Exp_1$) of 90 ms, the second setup condition candidate may comprise the analog gain ($AG_2$) of 8 and the exposure time ($Exp_2$) of 50 ms, and the third setup condition candidate may comprise the analog gain ($AG_3$) of 1 and the exposure time ($Exp_3$) of 10 ms. The image processor 200 selects the first setup condition candidate in a dark environment in which there is a lack of ambient light, selects the second setup condition candidate in an environment in which there is a moderate amount of ambient light, and selects the third setup condition candidate in a bright environment in which there is a large amount of ambient light, thereby controlling the image sensor 100.

The image processor 200 (e.g., the brightness measurer 240) may measure the brightness in the vicinity of the image sensor 100 using a previously stored lookup table. The lookup table is a set or array of previously calculated results of a given operation, and the electronic device 10 may store the lookup table in the form of a table or relational expression in a memory. Referring to the graph of FIG. 9, in the first setup condition candidate, if min lux is 10, and Hyst th H1 is 3000, the relational expression between a code and a brightness may be 12×(code)+10. Also, in the second setup condition candidate, if Hyst th L1 is 2000 and Hyst th H2 is 6000, the relational expression between a code and a brightness may be 16×(code)+2000. Also, in the third setup condition candidate, if Hyst th L2 is 5000 and max lux is 10000, and the relational expression between a code and a brightness may be 20×(code)+5000. The image processor 200 may select any one of the three relational expressions based on the setup condition of the image sensor 100 at the time at which the image data (or the luminance data) is captured, and may identify the ambient brightness by substituting the calculated code (or the representative Y value) into the selected relational expression.

In the present disclosure, the values that can be set as the setup condition (e.g., analog gain and exposure time) of the image sensor 100 may be limited to some fixed pairs. That is, the values that can be set as the analog gain and exposure time of the image sensor 100 may be sparse.

Although the setup condition candidates of the image sensor 100 are illustrated as comprising three candidates in FIG. 9, it is an example, and embodiments of the present disclosure are not limited thereby. For example, when the measurable illuminance range is 10 lux to 10,000 lux and when the number of bits of the code is 8, the lux resolution may be 13 lux (9990 lux/(255×3)=13 lux) in FIG. 9. To improve the accuracy of brightness measurement by reducing the lux resolution, the device 10 may be designed using any of various methods, such as a method of increasing the number of setup condition candidates of the image sensor 100 to four or more candidates, a method of increasing the number of bits of the code, a method of reducing the measurable illuminance range, and the like.

FIG. 10 is a diagram illustrating a method for changing the setup condition of an image sensor when a designated event occurs according to an embodiment of the present disclosure.

According to S314 of FIGS. 3 and S424 of FIG. 4, the image processor 200 (e.g., the image sensor controller 230) may change the setup condition of the image sensor 100 when a designated event (e.g., the case in which the first code has a minimum value or a maximum value) occurs. In FIG. 10, a specific example of the designated event and a method of changing the setup condition are described.

When the ambient environment changes (e.g., becomes bright or dark) while the image sensor 100 is capturing luminance data (or image data) depending on any one setup condition selected from among the setup condition candidates, the image processor 200 (e.g., the image sensor controller 230) may change the setup condition of the image sensor 100 according to a hysteresis loop, as described for FIG. 10. In the present disclosure, the hysteresis loop may indicate a circular loop configured such that a wide range of external brightness can be identified using a code having a limited number of bits by changing the setup condition of the image sensor 100 depending on the calculated value of the code.

Referring to (A) of FIG. 10, when the setup condition of the image sensor 100 corresponds to the second setup condition candidate and when the representative Y value (or the code) is 0, the image processor 200 (e.g., the image sensor controller 230) may change the setup condition of the image sensor 100 for capturing an image (e.g., image data or luminance data) of the next frame to the first setup condition candidate. The image sensor 100 provides first image data captured in the state in which the analog gain is 8 and the exposure time is 50 ms to the image processor 200, and when the first code calculated based on the first image data by the image processor 200 (e.g., the luminance calculator 220) is 0, the image processor 200 (e.g., the image sensor controller 230) may change the setup condition of the image sensor 100 such that the analog gain is set to 16 and the exposure time is set to 90 ms. The image processor 200 (e.g., the image sensor controller 230) changes the setup condition of the image sensor 100, thereby preventing deviation from illuminance that can be measured through the first code.

Referring to (B) of FIG. 10, when the setup condition of the image sensor 100 corresponds to the first setup condition candidate and when the representative Y value (or the code) is 255, the image processor 200 (e.g., the image sensor controller 230) may change the setup condition of the image sensor 100 for capturing an image (e.g., image data or luminance data) of the next frame to the second setup condition candidate. The image sensor 100 provides first image data captured in the state in which the analog gain is 16 and the exposure time is 90 ms to the image processor 200, and when the first code calculated based on the first image data by the image processor 200 is 255, the image processor 200 (e.g., the image sensor controller 230) may change the setup condition of the image sensor 100 such that the analog gain is set to 8 and the exposure time is set to 50 ms.

Referring to (C) of FIG. 10, when the setup condition of the image sensor 100 corresponds to the second setup condition candidate and when the representative Y value (or the code) is 255, the image processor 200 (e.g., the image sensor controller 230) may change the setup condition of the image sensor 100 for capturing an image (e.g., image data or luminance data) of the next frame to the third setup condition candidate. The image sensor 100 provides first image data captured in the state in which the analog gain is 8 and the exposure time is 50 ms to the image processor 200, and when the first code calculated based on the first image data by the image processor 200 is 255, the image processor 200 (e.g., the image sensor controller 230) may change the setup condition of the image sensor 100 such that the analog gain is set to 1 and the exposure time is set to 10 ms.

Referring to (D) of FIG. 10, when the setup condition of the image sensor 100 corresponds to the third setup condition candidate and when the representative Y value (or the code) is 0, the image processor 200 (e.g., the image sensor controller 230) may change the setup condition of the image sensor 100 for capturing an image (e.g., image data or luminance data) of the next frame to the second setup condition candidate. The image sensor 100 provides first image data captured in the state in which the analog gain is 1 and the exposure time is 10 ms to the image processor 200, and when the first code calculated based on the first image data by the image processor 200 is 0, the image processor 200 (e.g., the image sensor controller 230) may change the setup condition of the image sensor 100 such that the analog gain is set to 8 and the exposure time is set to 50 ms.

Referring to (A) to (D) of FIG. 10, the image processor 200 (e.g., the image sensor controller 230) may increase the analog gain and exposure time of the image sensor 100 in response to the first code (or the representative Y value) having the minimum value (e.g., 0). Also, the image processor 200 (e.g., the image sensor controller 230) may decrease the analog gain and exposure time of the image sensor 100 in response to the first code (or the representative Y value) having the maximum value (e.g., 255).

In the present disclosure, the case in which the representative Y value is the minimum value (e.g., 0) may be the case in which charges are rarely generated in the pixels of the image sensor 100 because the analog gain of the image sensor 100 is too low or the exposure time thereof is too short. When the representative Y value is the minimum value, the image processor 200 may increase the analog gain and exposure time of the image sensor 100. Also, the case in which the representative Y value is the maximum value (e.g., 255) may be the case in which all of the pixels of the image sensor 100 are saturated because the analog gain of the image sensor 100 is too high or the exposure time thereof is too long. When the representative Y value is the maximum value, the image processor 200 may decrease the analog gain and exposure time of the image sensor 100.

Although the value capable of being represented through the first code is illustrated as ranging from 0 to 255 in FIG. 10, it is set on the assumption that the first code is configured with eight bits, and the scope of the present disclosure is not limited thereto. For example, when the first code is configured with 9 bits, a minimum value and a maximum value, among values capable of being represented through the first code, may be 0 and 511, respectively.

In accordance with the present disclosure, because an ambient brightness may be measured using an image sensor, the image sensor may replace an ambient light sensor (or an illuminance sensor).

What is claimed is:

1. An image processor, comprising:
a receiver configured to receive image data from an image sensor;
a luminance calculator configured to calculate a code corresponding to a luminance value of the image data based on the image data;
an image sensor controller configured to change a setup condition of the image sensor in response to the code having a minimum value or a maximum value, among values capable of being assumed by the code; and a brightness measurer configured to output a brightness value in a vicinity of the image sensor, which is identified using the changed setup condition and the code, wherein the image sensor controller is configured to change the setup condition of the image sensor according to a hysteresis loop.

2. The image processor according to claim 1, wherein the luminance calculator is configured to segment the image data into two or more regions and calculate the code based on respective luminance values of the two or more regions.

3. The image processor according to claim 1, wherein the setup condition includes at least one of an analog gain of the image sensor or an exposure time of the image sensor.

4. The image processor according to claim 1, wherein the setup condition is any one setup condition selected from among a designated number of setup condition candidates having preset values.

5. The image processor according to claim 4, wherein the designated number is 3.

6. The image processor according to claim 1, wherein the code has 8 bits, and
wherein the minimum value and the maximum value are 0 and 255, respectively.

7. The image processor according to claim 1, wherein the image sensor controller is configured to increase an analog gain and an exposure time of the image sensor in response to the code having the minimum value.

8. The image processor according to claim 1, wherein the image sensor controller is configured to decrease an analog gain and an exposure time of the image sensor in response to the code having the maximum value.

9. The image processor according to claim 1, wherein the brightness measurer is configured to identify the brightness value using a lookup table associated with the changed setup condition and the code.

10. A device, comprising:
an image sensor configured to acquire image data under control of an image processor; and
the image processor configured to calculate a first code corresponding to a luminance value of first image data based on the first image data received from the image sensor, to change a setup condition of the image sensor in response to the first code having a minimum value or a maximum value, among values capable of being assumed by the first code, and to output a brightness value in a vicinity of the image sensor, which is identified using the changed setup condition and a second code corresponding to second image data captured through the image sensor depending on the changed setup condition, wherein the image processor is configured to change the setup condition of the image sensor according to a hysteresis loop.

11. The device according to claim 10, further comprising:
a display; and
a processor configured to control the display based on the brightness value.

12. A method of measuring a brightness, comprising:
calculating a first code corresponding to a luminance value of first image data captured through an image sensor;
changing a setup condition of the image sensor in response to the first code having a minimum value or a maximum value, among values capable of being assumed by the first code; and
identifying a brightness in a vicinity of the image sensor using the changed setup condition and a second code corresponding to second image data captured through the image sensor depending on the changed setup condition,
wherein changing the setup condition of the image sensor comprises changing the setup condition of the image sensor according to a hysteresis loop.

13. The method according to claim 12, wherein calculating the first code corresponding to the luminance value of the first image data comprises:
segmenting the first image data into two or more regions; and
calculating the first code based on respective luminance values of the two or more regions.

14. The method according to claim 12, wherein changing the setup condition comprises:
selecting any one setup condition from among a designated number of setup condition candidates having preset values.

15. The method according to claim 12, wherein changing the setup condition of the image sensor comprises:
increasing an analog gain and an exposure time of the image sensor in response to the first code having the minimum value.

16. The method according to claim 12, wherein changing the setup condition of the image sensor comprises:
decreasing an analog gain and an exposure time of the image sensor in response to the first code having the maximum value.

17. The method according to claim 12, wherein identifying the brightness in the vicinity of the image sensor comprises:
identifying the brightness using a lookup table associated with the changed setup condition and the second code.

* * * * *